Patented Oct. 13, 1925.

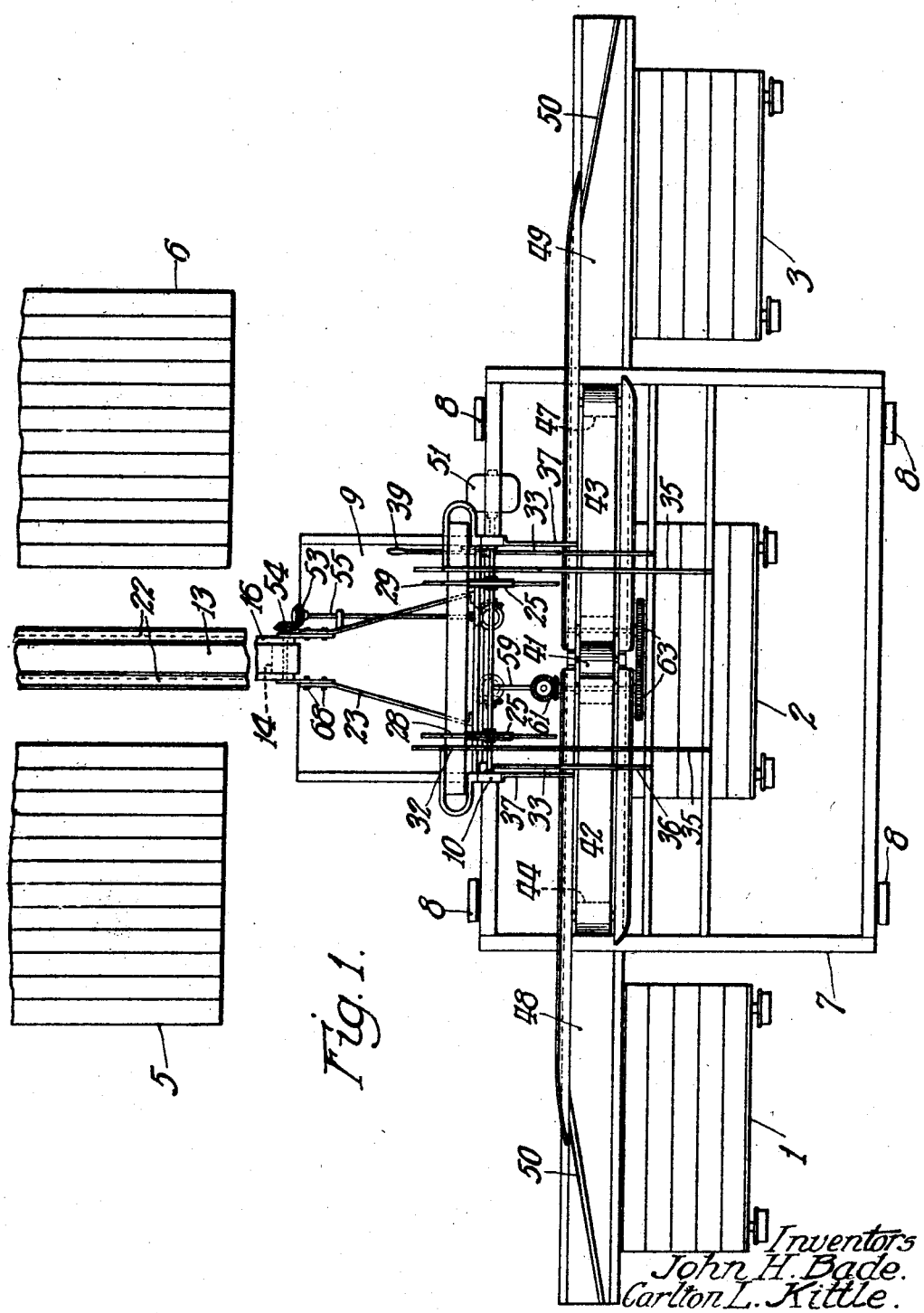

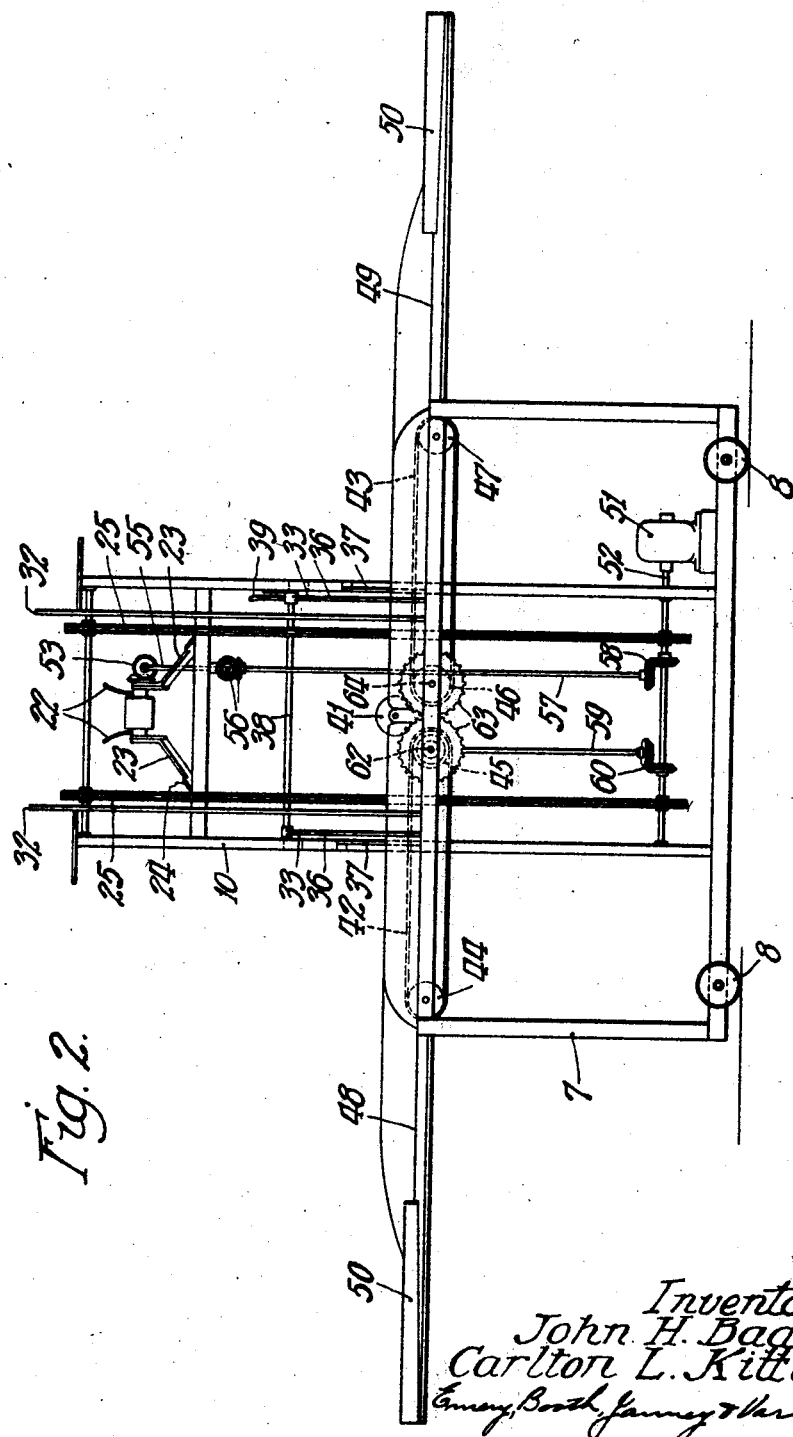

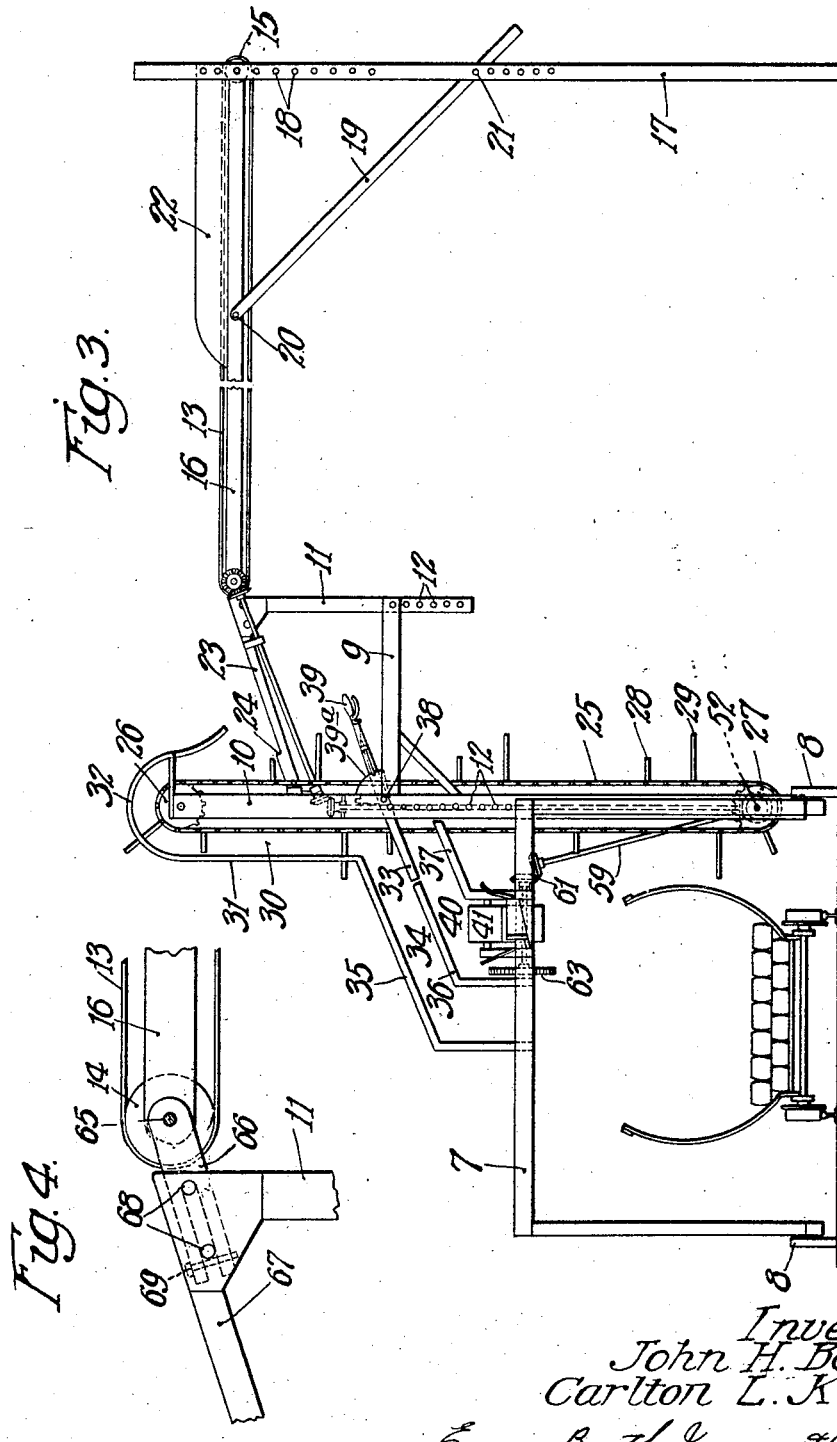

1,556,577

UNITED STATES PATENT OFFICE.

JOHN H. BADE AND CARLTON L. KITTLE, OF LAWRENCEBURG, INDIANA, ASSIGNORS OF ONE-THIRD TO ERNEST J. STOCKING, OF EVANSTON, ILLINOIS.

CROSSTIE HANDLER.

Application filed June 15, 1923. Serial No. 645,494.

*To all whom it may concern:*

Be it known that we, JOHN H. BADE and CARLTON L. KITTLE, citizens of the United States, and residents of Lawrenceburg, in the county of Dearborn and State of Indiana, have invented an Improvement in Crosstie Handlers, of which the following is a specification.

The object of the present invention is to reduce the labor and cost of handling railroad cross-ties, timbers and the like in operations involving distribution or loading or both.

For example, the invention may be utilized in such operations as the removal of cross-ties from the yard of a creosoting or preserving plant, sorting the ties as to size, and loading the assorted ties on trucks or dolly cars for delivery to treating retorts.

Manual work of this kind is very heavy and can only be performed by extraordinarily physically strong men. In other words, the work is such as to require the employment of labor of a special or semi-skilled class. Furthermore, on account of the heavy nature of the work, it cannot be carried on by hand expeditiously except by the employment of a considerable number of men. Hence the ordinary labor cost of handling cross-ties between the yards and treating retorts is a large item in the cost of general operation of a preserving plant.

The present invention enables the heavy work incident to such operations to be performed mechanically, while the remaining manual work is reduced to a minimum and can be performed by men of ordinary strength. Thus operations of the character indicated can be conducted much more easily and expeditiously and with considerably less expense than by the ordinary method of employing husky laborers for removing, transporting, sorting and loading ties.

The invention will be best understood by reference to one practicable form of apparatus embodying the invention which is shown in the annexed drawings.

In said drawings:

Fig. 1 is a plan view of the illustrative apparatus, shown arranged for conveying cross-ties or timbers from piles in the yard and distributing them according to sizes into trucks or dolly cars, Fig. 2 is a front elevation of said apparatus, Fig. 3 is a side elevation, Fig. 4 is a detail view of a separable connection between the conveyor and main frame of the apparatus.

In Fig. 1 of the drawings, three trucks or dolly cars, 1, 2, 3 are shown standing on a track adjacent to piles of cross-ties. Two of such piles are indicated at 5 and 6.

The illustrative apparatus is adapted for conveying cross-ties from the piles and for loading the ties, according to assorted sizes, on any one of the three trucks.

The main frame of the apparatus, designated by the numeral 7, may be constructed to straddle the track and trucks. It is shown arranged over the middle truck 2, while the trucks 1 and 3 are shown disposed at either side of the apparatus.

The frame may be mounted upon suitable tractor wheels 8, so that the apparatus may be conveniently transported from one part of the yard to another.

The apparatus may be operated by a single man, who stands on an operator's platform indicated at 9. This platform is adjustably supported by the upright frame member 10 and hanger 11, shown having a series of holes 12 to receive the bolts or rods of the platform.

The apparatus includes a conveyor 13 which may be conveniently positioned to receive cross-ties from a pile. For instance, as shown in Fig. 1, the conveyor may extend between the adjacent tie piles 5 and 6, and ties may be skidded or otherwise transferred from the piles onto the conveyor.

Said conveyor is shown in the form of an endless belt running around pulleys or rollers 14 and 15, the shafts of which are mounted in an elongated support or frame member 16.

The conveyor may be swung bodily up or down for adjusting its receiving end in accordance with the height of the tie piles. For this purpose, the conveyor support or frame 16 is pivotally attached to the main frame of the apparatus; while the receiving end of the conveyor is adjustably supported by the standard 17, shown provided with adjusting holes 18 to receive the pins or bolts for the conveyor support 16. Braces 19 are shown pivotally connected to the conveyor support at 20 and adjustably secured to the standards 17 at 21.

The cross-ties may be laid crosswise or lengthwise upon the conveyor. In the illustrative apparatus, when used as indicated in the drawings, the conveyor extends between adjacent tie piles and the ties may be easily rolled or dumped from the tops of the piles onto the conveyor, thus lying lengthwise thereon.

At the receiving end of the conveyor, its supporting frame member 16 is shown constructed with flaring wings 22, providing a trough-like structure into which the ties may be received so as to fall correctly upon the conveyor.

The ties are delivered by the conveyor to presentation means comprising in this instance declined skidways 23, shown arranged at a convenient height above the operator's platform to permit the operator to manipulate the ties as they are brought forward by the conveyor. Where, as in the illustrative structure, the ties are fed lengthwise by the conveyor, the operator standing on the platform 9 may conveniently turn the ties crosswise of the skidways as the ties are delivered thereto. The ties slide down the skidways until arrested by stops 24.

For removing or picking up the ties from the skidways, the illustrative apparatus includes carrier means comprising in this instance a pair of endless elevating chains 25. The upper and lower sprocket wheels of said chains are indicated at 26 and 27. Elevating chains are equipped with pairs of short and long dogs 28 and 29, each pair of dogs adapted to receive a tie between them. A tie resting on the skidways 23 will be held by the stops 24 in such position as to permit a pair of short dogs 28 to move upwardly past the tie, while the tie will be picked up by the ensuing pair of long dogs 29.

The elevating chains will carry the tie upwardly over its upper sprocket wheels 26 and thence downwardly through a chute 30 formed in part by the descending runs of the elevating chains and in part by guards 31. Said guards 31 have curved extensions 32 over the upper ends of the elevating chains, so that the tie is held against displacement on the elevating chains as it is carried from the ascending to the descending stage.

As the elevating chains bring the tie over and down through the chute 30, the tie will rest upon a short dog 28, thus supporting the tie and preventing it from dropping upon the subjacent means hereinafter referred to.

It will be observed that the tie is presented sidewise to the elevating chains, which pick up and lift the tie and carry it over and down on their descending runs for presentation to means for removing and depositing the tie. The illustrative apparatus includes means comprising selectively-operable instrumentalities whereby the tie may be deposited sidewise in front of the presentation means, for instance into the truck 2, or may be shifted endwise and then deposited sidewise, for instance into either of the trucks 1 or 3. The specific instrumentalities employed for this purpose in the illustrative apparatus will now be described.

Below the chute 30 is a pair of displaceable throwouts 33, consisting of declined arms adapted to remove a tie brought downward on the descending runs of the elevating chains. A tie so removed will slide down the chute 34 and be deposited into the subjacent truck 2. Said chute 34 is formed by the lower portions 35 of the guards 31, and by declined bars 36 in alignment with the throwouts 33.

The throwouts 33 may occupy a position in the path of a descending tie, as shown in the drawings, or they may be swung out of the way to permit the tie to descend upon a subjacent pair of stationary throwouts 37.

The displaceable throwouts 33 may be under control of the operator standing on the operator's platform 9. For this purpose, the throwout arms may, for example, be attached to a rocker shaft 38, provided with a lever 39 within reach of the operator and by which he can rock the shaft to swing the throwout arms 33 downwardly from their supports to a position clear of the descending tie. The lever 39 may be provided with a locking bolt engaging a stationary notched sector 39ᵃ to lock the throwouts in desired position.

If the throwouts 33 are displaced, the descending tie will be removed from the elevating chains by the stationary throwouts 37, and will slide down the chute 40 formed between said throwouts 37 and the bars 36.

A tie removed by the stationary throwouts 37 is to be deposited upon or into either of the trucks 1 or 2. To control the direction in which such tie shall be discharged, there is provided in the illustrative apparatus a roller 41, shown arranged in or proximate to the bottom of the chute 40 and transversely of the discharging tie. Hence a tie arrested by this roller will rest thereon approximately midway of its length, so as to permit the tie to tilt on the roller, with its heavier end downward.

Conveyors 42 and 43 are shown running in opposite directions from the roller 41 to the opposite sides of the apparatus, or, in other words, toward the respective trucks 1 and 3. The roller 41 is arranged at a higher elevation than these conveyors, so that a tie arrested by the roller will tilt, or may be tilted, so as to be engaged by one or the other of said conveyors 42 and 43, thereby determining to which of the trucks 1 or 3 the tie shall be supplied.

The operator of the apparatus, stationed on the operator's platform 9, may readily control the direction of tilting by shifting the tie on the skids 23 so that when picked up by the elevating chains it will project more or less to the right or left. Thus the tie will be deposited upon the roller 41 with its center of gravity to a desired side of the roller, causing the tie to tilt in the direction desired for conveyance to the truck 1 or the truck 3.

Said conveyors 42 and 43 are shown as endless belts. The pulleys or rolls around which the belts run are designated respectively at 44, 45, 46 and 47.

Associated with these conveyors, and extending beyond their delivery ends, are inclined supports 48 and 49 respectively, each provided across its face with a deflector 50. Ties deposited upon the respective conveyors 42 and 43 will be delivered to the respective supports, which will cause them to discharge into or upon the subjacent trucks 1 and 3.

The mode of operation of the illustrative apparatus, as thus far described, may be briefly summarized as follows:

Cross-ties are brought forward from the stock piles on the conveyor 13, in this instance the ties being laid lengthwise on the conveyor, one tie behind another. As a tie is delivered from the conveyor, the operator standing on the platform 9 manually turns the tie to lie across the skidways 23. The tie slides down the skidways until arrested by the stops 24. From this position the tie is picked up by a pair of long dogs 29 on the ascending runs of the elevating chains 25. As the tie is thus picked up, the operator may shove it against the elevating chains, or it may be so shoved by a succeeding tie on the skids. The elevating chains carry the tie over and around their upper sprocket wheels 26 to the descending side of the chains, so that the tie lodges upon the adjacent pair of short dogs 28. If the operator desires to deposit the tie on the middle truck 2, he leaves the movable throwouts 33 in operative position, or throws them into such position if not already in place; said throwouts being controlled in this instance by the lever 39. In such event, the tie will be removed from the short supporting dogs 28 on the descending runs of the chains, and will slide down the chute 34 and drop upon or into the truck 2. If, however, the operator desires to deliver the tie to either of the other trucks, 1 or 3, he swings the throwouts 33 out of the way, or leaves them out of the way if already in displaced position. In that event, the tie carried by the descending runs of the chains will pass the chute 34 and will be removed from the chains by the stationary throwouts 37. The tie to be supplied to either of trucks 1 or 3 may have been previously shifted endwise by the operator, either while on the skidways or while carried by the ascending runs of the elevating chains, so as to cause its center of gravity to be to the right or left of the roller 41. Thus when removed by the stationary throwouts 37, the tie will lodge upon and across the roller 41 with its heavier end toward the truck to which it is intended to be supplied. The tie will accordingly tilt and lodge its heavier end upon the conveyor 42 or 43, as the case may be, and be drawn by such conveyor off the roller and discharged to the inclined board or support beyond the conveyor, and dropped on or into the truck beneath, i. e., the truck 1 or 3 as the case may be.

Thus the operator may inspect the ties, as they are delivered one after another by the conveyor 13; and by a slight shifting or adjustment of the ties on their supporting means, together with proper control of the throwouts 33 through the convenient lever 39, he may cause them to be distributed or loaded into selected carriers of a number of carriers in accordance with a desired sorting as to size, grade or otherwise. For instance, he may cause ties of one size to be delivered to the truck 1, and ties of less size to be delivered to the trucks 2 and 3, or certain sizes to each of the trucks.

Aside from the convenience for assorting and distributing according to assortment, the apparatus is valuable for loading purposes, even though no assorting were desired, since it relieves the men of the heavy work of transporting and lifting the ties onto trucks. It reduces the manual labor incident to operations of the character hereinbefore indicated to that of dislodging individual ties from piles and tumbling them onto the conveyor 13, and of shifting the ties on their supporting skidways for presentation to the elevating chains, together with manipulation of the lever 39 for controlling the movable throwouts 37. Such duties may of course be readily performed by ordinary laborers of moderate or even inferior strength. Moreover, the work being principally mechanically performed, it can be carried on very expeditiously, and with a minimum employment of labor, and consequently at a reduced cost as compared with ordinary manual work.

The machinery of the apparatus may be operated by any appropriate mechanism, such, for instance, as that illustrated in the drawings, which will now be described.

Suitably mounted in the main frame of the apparatus is a motor 51 which drives the main drive shaft 52, which in this instance is the shaft of the lower sprocket wheels 27 of the elevating chains 25. Thus the chains 25 are driven by said shaft 52 from the motor 51.

The conveyor 13 is driven through bevel gears 53 and 54 from an inclined shaft 55. Said inclined shaft 55 is driven by bevel gearing 56 from a vertical shaft 57, which in turn is driven from the main shaft 52 through gearing 58.

The conveyors 42 and 43 are driven from vertically disposed though slightly inclined shaft 59, which in turn is driven from the main shaft through bevel gearing 60. The upper end of said shaft 59 is connected through bevel gears 61 with the pulley shaft 62 of the conveyor 42; while said shaft 62 is connected by intermeshing gears 63 with the corresponding pulley shaft 64 of the other conveyor 43.

As before stated, the apparatus may be wheeled about the yard for utilization at different points. To facilitate convenient transportation, it is desirable to provide for detachment of the conveyor 13. This is provided for by means such as shown in Fig. 4, where the shaft 65 at the delivery end of the conveyor 13 is shown mounted in a pair of plate-like members 66 detachably connected to the main frame member 67 of the apparatus. For this purpose the members 66 are shown slotted to receive studs 68 projecting from the frame member. Said members 66 may be secured against endwise displacement on said studs by bolts or pins 69. Upon withdrawing said bolts or pins 69, the conveyor 13 together with its supporting frame member may be disconnected.

Thus the apparatus may be conveniently disassembled for the purpose of moving it from one part of a storage yard to another, and as conveniently reassembled in position for handling ties and the like.

Obviously the present invention is not limited to the specific details of construction and arrangement of the illustrative apparatus, since the same may be variously modified in accordance with various requirements and different purposes for which such apparatus may be employed. Moreover it is not essential that all of the features of the invention be used conjointly, since they may be advantageously used in various different combinations and subcombinations.

Having described an illustrative embodiment of our invention, we claim:

1. An apparatus of the class described comprising, in combination, means for receiving cross-ties or the like and delivering them successively to position to be picked up; and loading mechanism including means for picking up the successively presented ties, and a plurality of selectively operable means to which said ties are delivered by the picking-up means, one of said last named means adapted for depositing ties sidewise; and means associated with other of said last named means for delivering ties endwise.

2. An apparatus of the class described comprising, in combination, loading mechanism constructed and arranged for picking up successively presented cross-ties or the like and depositing them, including means for controlling the depositing of the ties at different points of deposit, according to a desired sorting of the ties; and means including a conveyor for receiving ties from a source of supply and feeding them lengthwise, and means for receiving the ties from said conveyor and delivering them crosswise for presentation to the picking up means of the loading mechanism.

3. An apparatus of the class described comprising, in combination, mechanism for receiving successively presented cross-ties or the like and depositing them in carriers; declined skidways for presenting the ties; and a conveyor for bringing ties to said skidway; said conveyor being pivotally connected with the framework of said mechanism and adapted to be swung bodily for elevating or lowering its receiving end in accordance with the height of a pile from which the ties are supplied to said conveyor; and means for adjustably supporting the receiving end of the conveyor at a desired elevation.

4. An apparatus of the class described comprising, in combination, means for delivering cross-ties or the like successively to positions to be picked up; means for picking up the successively presented ties; means for removing the ties from the picking up means; a plurality of conveyors for delivering ties to different points of deposit; and means cooperating with the removing means for delivering a tie to a conveyor.

5. An apparatus of the class described comprising, in combination, means for delivering cross-ties or the like successively to position to be picked up; means for picking up, lifting and then lowering the presented ties; a plurality of means for removing the ties while being lowered by the said means which picks up, lifts and lowers the ties; means for controlling the said plurality of removing means, whereby a tie may be removed by a selected means; and a plurality of means for delivering to different locations ties removed by the respective removing means.

6. An apparatus of the class described comprising, in combination, means for delivering cross ties or the like successively to position to be picked up; means for picking up, lifting and then lowering the successively presented ties; and throwouts arranged one above another for removing the ties while being lowered, with associated means for discharging the ties, a superposed throwout means being displaceable to permit descent of a tie to a subjacent throwout means; conveyors for delivering ties to different points; and means cooperating with one of said throwouts for discharging ties upon said conveyors.

7. An apparatus of the class described comprising, in combination, means for delivering cross ties or the like successively to position to be picked up; means for picking up, lifting and then lowering the successively presented ties; and throwouts arranged one above another for removing the ties while being lowered, with associated means for discharging the ties; a superposed throwout means being displaceable to permit descent of a tie to a subjacent throwout means; means adapted to arrest a tie removed by a throwout means; and conveyors running in opposite directions from said last named means, on which the tie will tilt so as to be engaged by one or the other of said conveyors.

8. In apparatus of the class described, the combination of endless elevating chains, having pairs of long and short dogs; and means for holding a cross tie or the like in such relation to the elevating chains as to be passed by ascending short dogs but to be picked up by the ensuing long dogs; said elevating chains adapted to carry the tie to their descending sides, and to support the tie by the short dogs on their descending runs.

9. In apparatus of the class described, the combination of endless elevating chains, having pairs of long and short dogs; and means for holding a cross tie or the like in such relation to the elevating chains as to be passed by an ascending short dog but to be picked up by the ensuing long dogs; said elevating chains adapted to carry the tie to their descending sides, and to support the tie by the short dogs on their descending runs; and means for removing the tie from the descending runs of the elevating chains.

10. In apparatus of the class described, the combination with endless elevating chains having a pair of dogs; means for lodging a tie between said dogs; and vertical guards opposite the descending runs of said chains cooperating therewith to provide a chute; said guards having curved extensions over the upper ends of the elevating chains providing an extension of said chute; said guards and curved extensions thereof cooperating with said chains to prevent dislodgment of the tie as it is turned over and carried down the descending runs of the chains.

11. In apparatus of the class described, the combination of elevating chains having tie-engaging dogs; and means cooperable with said chains to provide a chute at the descending side of said chains and a plurality of off-set delivery chutes; a movable throwout forming in part the lower side of one of said chutes; the lower part of another of said chutes constituting a fixed throwout.

12. In apparatus of the class described, the combination of declined skidways having arresting stops; a conveyor for receiving ties and delivering them to said skidways; elevating chains having dogs for removing ties from said skidways; and means comprising a chute associated with the descending side of said chains and off-set chutes and throwouts for removing ties from the descending runs of the elevating chains.

13. In apparatus of the class described, the combination of declined skidways to receive ties placed cross-wise of the skidways; tie arresting stops on the skidways; and elevating chains having long and short dogs; said stops located to hold a tie out of the path of the ascending short dogs and in position to be picked up by the long dogs.

14. In apparatus of the class described, the combination of means for lowering ties; a plurality of discharge chutes one above another, into either of which a tie may be discharged; displaceable inclined means for removing a tie from the lowering means into the upper chute, said means when in operative position forming a part of the inclined bottom of said chute; and subjacent inclined means for removing a tie from the lowering means into the lower chute.

15. In apparatus of the class described, the combination with tie discharging means; a roller; conveyors extending in opposite directions from said roller; said roller having its upper surface above the level of the conveyors; the discharging means being arranged to deliver a tie crosswise of said roller, so that the tie will tilt thereon and rest at one end upon one of the conveyors; and said conveyors arranged to carry the ties endwise from the position to which they are delivered on said roller.

16. In apparatus of the class described, the combination of conveyors running in opposite directions and adapted to convey ties arranged lengthwise thereon; means for causing discharge of a tie upon one or the other of said conveyors; and means at the delivery ends of said conveyors for effecting desired depositing of the ties.

17. An apparatus of the class described comprising, in combination, an operator's platform; conveying means arranged to receive cross-ties or the like and deliver them adjacent to said platform; inclined skidways to receive the ties successively delivered by said conveying means, and on which the operator, while stationed on said platform, may arrange the ties for presentation to elevating means; and loading mechanism including elevating means for picking up ties successively positioned on said skidways and for lowering them, and means for removing and depositing the ties.

18. An apparatus of the class described comprising, in combination, means for holding a tie for presentation to carrying means; a carrier adapted to take up ties from said first named means; selecting means for removing ties from said carrier; and means for distributively depositing ties removed by said selecting means.

19. An apparatus of the class described comprising, in combination, a conveyor on which cross-ties or the like are laid endwise, one behind another; means to which said ties are delivered and on which the ties may conveniently be turned to crosswise position; and mechanism constructed and arranged for picking up the ties from said last named means and depositing the ties.

20. In apparatus of the class described, the combination with mechanism for picking up and depositing ties, of means for delivering ties thereto comprising a conveyor adapted to be positioned between tie piles and having a support constructed with a trough-like formation at its receiving end to facilitate depositing of ties from the piles onto the conveyor.

21. An apparatus of the class described comprising, in combination, mechanism adapted to receive a cross-tie or timber presented sidewise; and means for holding a tie for sidewise presentation to said mechanism; said mechanism comprising means for elevating the tie and means for depositing the tie sidewise in front of the place of presentation to said mechanism.

22. An apparatus of the class described comprising, in combination, mechanism adapted to receive a cross-tie or timber presented sidewise; and means for holding a tie for sidewise presentation to said mechanism, said mechanism comprising means for elevating the tie and means for moving the tie endwise and then depositing it sidewise.

23. An apparatus of the class described comprising in combination, mechanism adapted to receive a crosstie or timber presented sidewise; and means for holding a tie for sidewise presentation to said mechanism; said mechanism comprising means for picking up the tie and a plurality of selectively-operable means for depositing the tie.

In testimony whereof we have signed our names to this specification.

JOHN H. BADE.
CARLTON L. KITTLE.